United States Patent
Chikusa et al.

(10) Patent No.: US 7,750,099 B2
(45) Date of Patent: Jul. 6, 2010

(54) METHOD FOR PRODUCING AN AQUEOUS DISPERSION CONTAINING A COMPLEX OF POLY(3,4-DIALKOXYTHIOPHENE) AND A POLYANION

(75) Inventors: Yasuo Chikusa, Tatsuno (JP); Hideaki Tamakoshi, Tatsuno (JP)

(73) Assignee: H. C. Starck GmbH, Goslar (DE)

( * ) Notice: Subject to any disclaimer, the term of this patent is extended or adjusted under 35 U.S.C. 154(b) by 434 days.

(21) Appl. No.: 11/178,852

(22) Filed: Jul. 11, 2005

(65) Prior Publication Data

US 2006/0020092 A1 Jan. 26, 2006

(30) Foreign Application Priority Data

Jul. 12, 2004 (JP) .............................. 2004-204450

(51) Int. Cl.
*C08F 228/06* (2006.01)
(52) U.S. Cl. ..................................................... 526/256
(58) Field of Classification Search .................. 526/256
See application file for complete search history.

(56) References Cited

U.S. PATENT DOCUMENTS

2004/0043162 A1  3/2004 Tahon et al.

FOREIGN PATENT DOCUMENTS

| EP | 0 553 502 A1 | 8/1993 |
| EP | 1 384 739 A1 | 1/2004 |
| EP | 1384739 A1 * | 1/2004 |
| WO | WO 2004/020444 A | 3/2004 |
| WO | WO 2004/029128 A | 4/2004 |

OTHER PUBLICATIONS

Anonymus: "Baytron® P VP AI 4083 & Baytron® P VP CH 8000—Product information for Electronic Grades Designed for use as Hole-Injection Material in OLEDs"; Product Information on line; Jun. 21, 2004; XP-002348431.
Song et al; "Study on the concentration effects in size exclusion chromatography VII. A quantitative verification for the model theory of concentration and molecular mass dependences of hydrodynamic volumes for polydisperse polymers"; Journal of Chromatography A, 961 (2002) pp. 155-170.

* cited by examiner

*Primary Examiner*—Robert D. Harlan
(74) *Attorney, Agent, or Firm*—Norris McLaughlin & Marcus, P.A.

(57) ABSTRACT

The method for producing an aqueous dispersion containing a complex of poly(3,4-dialkoxythiophene) and a polyanion comprises: a process of polymerizing 3,4-dialkoxythiophene in the presence of a polyanion by using an oxidizing agent in an aqueous solvent, in which polystyrene-sulfonic acid having a specific molecular weight and a sulfonation degree or polystyrenesulfonic acid having another specific sulfonation degree is used as the polyanion, or in which pH of the reaction mixture during the reaction is set to a specific value.

6 Claims, 1 Drawing Sheet

Fig.1

METHOD FOR PRODUCING AN AQUEOUS DISPERSION CONTAINING A COMPLEX OF POLY(3,4-DIALKOXYTHIOPHENE) AND A POLYANION

BACKGROUND OF THE INVENTION

1. Field of the Invention

The present invention relates to a method for producing an aqueous dispersion containing a complex of poly(3,4-dialkoxythiophene) and a polyanion, and relates to an aqueous dispersion obtained by the method.

2. Description of the Related Art

Conductive transparent films are employed for coating transparent electrodes of liquid crystal displays, electroluminescence displays, plasma displays, electrochromic displays, solar cells, touch panels and the like, and for coating substrates such as those made of electromagnetic shielding material. The most widely employed conductive transparent film is a vapor deposited film made of indium-doped tin oxide (i.e., ITO). However, the formation of ITO film by a vapor deposition process has problems such as the necessity of a high temperature for film formation and high cost for film formation. ITO film can be formed by a coating method. However, the film formation by this method requires a high temperature, the conductivity of the film depends on the degree of dispersion of ITO, and the haze value of the film is not always low. Furthermore, for an inorganic oxide film such as an ITO film, cracks tend to be generated by the bending of the substrate, so that the conductivity may be reduced.

On the other hand, a conductive transparent film made of conductive polymer that can be prepared at a low temperature and a low cost has been proposed as a conductive transparent film made of an organic material. As for the conductive polymer that can be used for such a film, Japanese Patent Publication No. 2636968 discloses a method for producing a complex of poly(3,4-dialkoxythiophene) and a polyanion. This complex has good water dispersibility. A thin film produced by applying a coating composition containing an aqueous dispersion containing the complex to a substrate has a sufficient antistatic function, but insufficient transparency and conductivity.

Japanese Laid-Open Patent Publication No. 8-48858 describes that a thin film produced by applying a coating composition to a substrate has an improved conductivity, wherein the coating composition is obtained by adding a compound that is selected from the group consisting of a compound having two or more hydroxyl groups, a compound having an amide group, and a compound having a lactam group to an aqueous dispersion containing a complex of poly (3,4-dialkoxythiophene) and a polyanion described in Japanese Patent Publication No. 2636968. Japanese Laid-Open Patent Publication No. 2000-153229 describes that a thin film produced by applying a coating composition containing a non-proton compound having a dielectric constant of ∈≧15 to a substrate and drying the resultant substrate at a temperature less than 100° C. has an improved conductivity.

All the coating compositions described in these publications have improved properties by adding a specific compound to the aqueous dispersion containing a complex of poly(3,4-dialkoxythiophene) and a polyanion described in Japanese Patent Publication No. 2636968, and the conductivities of the resultant films are comparatively improved. However, the aqueous dispersion containing the complex (i.e., a conductive polymer) is the same, so that the transparency and the conductivity of the resultant film obtained from the aqueous dispersion are not necessarily sufficient.

In Japanese Laid-Open Patent Publication No. 2004-59666 discloses that an aqueous dispersion containing a complex that can form a thin film having excellent transparency and conductivity can be obtained by using peroxodisulfuric acid as an oxidizing agent, when polymerizing 3,4-dialkoxythiophene in the presence of a polyanion or adding an acid to lower the pH at the time of polymerization. With this method, a thin film having relatively good transparency and conductivity can be formed, but there is a demand for development of a material that can be formed into a thin film having even better transparency and conductivity and a method for producing such a thin film.

SUMMARY OF THE INVENTION

The present invention is directed to solve the above-described problems, and the objective thereof is to develop a method for producing an aqueous dispersion containing a conductive polymer that can be formed into a conductive thin film having excellent transparency and conductivity, and an aqueous dispersion obtained by this method.

The inventors of the present invention conducted in-depth research to solve the problems, and found that an aqueous dispersion containing a conductive polymer having excellent transparency and conductivity can be obtained by employing at least one of the following conditions: when polymerizing 3,4-dialkoxythiophene in the presence of a polyanion, polystyrenesulfonic acid having a specific molecular weight or a specific sulfonation degree is used as the polyanion; and when polymerizing 3,4-dialkoxythiophene in the presence of a polyanion, the pH of the reaction mixture is set to a specific value during reaction, and thus achieved the present invention.

The first method of the present invention for producing an aqueous dispersion containing a complex of poly(3,4-dialkoxythiophene) and a polyanion comprises: polymerizing 3,4-dialkoxythiophene represented by formula (1):

(1)

(wherein $R^1$ and $R^2$ are independently hydrogen or a $C_1$-$C_4$ alkyl group, or together form a $C_1$-$C_4$ alkylene group which may optionally be substituted), wherein the polymerization is performed in the presence of the polyanion by using an oxidizing agent in an aqueous solvent, the polyanion is polystyrenesulfonic acid having a weight average molecular weight of 80,000 to 1,000,000, and the sulfonation degree of the polystyrenesulfonic acid is 99% or more.

The second method of the present invention for producing an aqueous dispersion containing a complex of poly(3,4-dialkoxythiophene) and a polyanion comprises: polymerizing 3,4-dialkoxythiophene represented by formula (1):

(1)

(wherein $R^1$ and $R^2$ are independently hydrogen or a $C_1$-$C_4$ alkyl group, or together form a $C_1$-$C_4$ alkylene group which may optionally be substituted), wherein the polymerization is performed in the presence of the polyanion by using an oxidizing agent in an aqueous solvent, and the polyanion is polystyrenesulfonic acid having a sulfonation degree of 80 to 99%.

The third method of the present invention for producing an aqueous dispersion containing a complex of poly(3,4-dialkoxythiophene) and a polyanion comprises: polymerizing 3,4-dialkoxythiophene represented by formula (1):

(1)

(wherein $R^1$ and $R^2$ are independently hydrogen or a $C_1$-$C_4$ alkyl group, or together form a $C_1$-$C_4$ alkylene group which may optionally be substituted), wherein the polymerization is performed in the presence of the polyanion by using an oxidizing agent in an aqueous solvent, and an acid selected from the group consisting of water-soluble inorganic acids and water-soluble organic acids is added to the reaction mixture so as to adjust the pH of the resultant reaction mixture to 0.82 or lower.

The fourth method of the present invention for producing an aqueous dispersion containing a complex of poly(3,4-dialkoxythiophene) and a polyanion comprises: polymerizing 3,4-dialkoxythiophene represented by formula (1):

(1)

(wherein $R^1$ and $R^2$ are independently hydrogen or a $C_1$-$C_4$ alkyl group, or together form a $C_1$-$C_4$ alkylene group which may optionally be substituted), wherein the polymerization is performed in the presence of the polyanion by using an oxidizing agent in an aqueous solvent, the polyanion is polystyrenesulfonic acid having a weight average molecular weight of 80,000 to 1,000,000, and an acid selected from the group consisting of water-soluble inorganic acids and water-soluble organic acids is added to the reaction mixture so as to adjust the pH of the resultant reaction mixture to 0.82 or lower.

The fifth method of the present invention for producing an aqueous dispersion containing a complex of poly(3,4-dialkoxythiophene) and a polyanion comprises: polymerizing 3,4-dialkoxythiophene represented by formula (1):

(1)

(wherein $R^1$ and $R^2$ are independently hydrogen or a $C_1$-$C_4$ alkyl group, or together form a $C_1$-$C_4$ alkylene group which may optionally be substituted), wherein the polymerization is performed in the presence of the polyanion by using an oxidizing agent in an aqueous solvent, the polyanion is polystyrenesulfonic acid having a sulfonation degree of 80 to 99%, and an acid selected from the group consisting of water-soluble inorganic acids and water-soluble organic acids is added to the reaction mixture so as to adjust the pH of the resultant reaction mixture to 0.82 or lower.

The present invention includes an aqueous dispersion containing a complex of poly(3,4-dialkoxythiophene) and a polyanion obtained by any one of the above-mentioned methods.

An aqueous dispersion containing a complex of poly(3,4-dialkoxythiophene) and a polyanion can be easily produced by the method of the present invention. When this aqueous dispersion is employed, a thin film can be formed easily on a substrate by a wet process even at a low temperature, and the resultant thin film has flexibility, and excellent transparency and conductivity.

DESCRIPTION OF THE PREFERRED EMBODIMENT

The method for producing an aqueous dispersion containing a complex of poly(3,4-dialkoxythiophene) and a polyanion of the present invention includes polymerizing 3,4-dialkoxythiophene represented by the following formula (1):

(1)

wherein $R^1$ and $R^2$ are independently hydrogen or a $C_1$-$C_4$ alkyl group, or together form a $C_1$-$C_4$ alkylene group which may optionally be substituted, wherein the polymerization is performed in the presence of the polyanion by using an oxidizing agent in an aqueous solvent.

In a first method of the present invention, the polyanion is a polystyrenesulfonic acid having a specific molecular weight and a specific sulfonation degree. In a second method, the polyanion is a polystyrenesulfonic acid having a specific sulfonation degree. In a third method, in the above-described polymerization process, the pH is set in a specific range. In a fourth method, the polyanion is a polystyrenesulfonic acid having a specific molecular weight, and in the above-described polymerization process, the pH is set in a specific range. In a fifth method, the polyanion is a polystyrenesulfonic acid having a specific sulfonation degree, and in the above-described polymerization process, the pH is set in a specific range. Hereinafter, these methods will be described in this order.

First Method

In 3,4-dialkoxythiophene represented by formula (1) that is used in this method, preferable examples of the $C_1$-$C_4$ alkyl groups represented by $R^1$ and $R^2$ include a methyl group, an ethyl group, and an n-propyl group. Examples of the $C_1$-$C_4$ alkylene group formed by $R^1$ and $R^2$ together include a 1,2-alkylene group and a 1,3-alkylene group, preferably a methylene group, a 1,2-ethylene group, and a 1,3-propylene group. Among these, the 1,2-ethylene group is particularly preferable. The $C_1$-$C_4$ alkylene group may optionally be substituted, and examples of the substituent include a $C_1$-$C_{12}$ alkyl group and a phenyl group. Examples of the substituent $C_1$-$C_4$ alkylene group include a 1,2-cyclohexylene group and a 2,3-butylene group. The 1,2-alkylene group that can be formed by $R^1$ and $R^2$ together and that may be substituted with a $C_1$-$C_{12}$ alkyl group is a typical example of the alkylene groups. This 1,2-alkylene group can be derived from 1,2-dibromoalkanes that can be obtained by bromination of an α-olefin such as ethene, propene, hexene, octene, decene, dodecene, or styrene.

In the first method, the polyanion used is a polystyrenesulfonic acid having a weight average molecular weight of 80,000 to 1,000,000, as described above. This molecular weight is preferably in the range from 80,000 to 700,000, more preferably from 150,000 to 500,000. The sulfonation degree (described below) of the polystyrenesulfonic acid is 99% or more, and in general, polystyrenesulfonic acid having a sulfonation degree of 100% is used. When polystyrenesulfonic acid having the specific molecular weight and the specific sulfonation degree is employed, a thin film formed by using an aqueous dispersion containing the resultant complex has excellent conductivity and transparency.

The amount of the polyanion used is preferably in the range from 50 to 3,000 parts by weight, more preferably in the range from 100 to 1,000 parts by weight, and most preferably in the range from 150 to 500 parts by weight with respect to 100 parts by weight of the 3,4-dialkoxythiophene.

The solvent used in the above-described method is an aqueous solvent, and water is particularly preferable. Alternatively, water containing a water-miscible solvent such as alcohols, (e.g., methanol, ethanol, 2-propanol and 1-propanol), acetone, and acetonitrile can be used.

In this method, examples of the oxidizing agent used in a polymerization reaction of 3,4-dialkoxythiophene include, but are not limited to, peroxodisulfuric acid, sodium peroxodisulfate, potassium peroxodisulfate, ammonium peroxodisulfate, inorganic salts of ferric oxide, organic salts of ferric oxide, hydrogen peroxide, potassium permanganate, potassium dichromate, perboric acid alkaline salts, and copper salts. Among these, peroxodisulfuric acid, sodium peroxodisulfate, potassium peroxodisulfate and ammonium peroxodisulfate are most preferable. Furthermore, as an oxidizing agent, a catalytic amount of metal ion such as iron ion, cobalt ion, nickel ion, molybdenum ion, or vanadium ion may be added, if necessary. The amount of the oxidizing agent used for the reaction is preferably 1 to 5 equivalents, and more preferably 2 to 4 equivalents, with respect to one mole of the thiophene.

In the method of the present invention, it is preferable that the pH of the reaction mixture during polymerization is relatively low (preferably 1.5 or less). When peroxodisulfuric acid is selected from the above-listed oxidizing agents and is added to the reaction system, the pH is generally 1.5 or less, which is suitable. The pH is adjusted by adding an acid to the reaction system as necessary.

As the acid, an acid selected from the group of water-soluble inorganic acids and water-soluble organic acids can be used. Examples of the inorganic acids include hydrochloric acid, sulfuric acid, nitric acid, phosphoric acid and perchloric acid. Examples of the organic acids include p-toluenesulfonic acid, benzenesulfonic acid, methanesulfonic acid, and trifluoromethanesulfonic acid.

The temperature of the reaction mixture during polymerization in the method is 0 to 100° C., preferably 0 to 50° C., and more preferably 0 to 30 ° C. for suppression of side reactions.

The polymerization reaction can be performed for 5 to 100 hours, depending on the type and the amount of the oxidizing agent, the polymerization temperature, the pH of the reaction mixture and the like. In general, the time is 10 to 40 hours.

Second Method 3,4-Dialkoxythiophene used in this method is the same as the 3,4-dialkoxythiophene used in the first method.

As the polyanion used in this method, a polystyrenesulfonic acid having a sulfonation degree of 80% to 99% is used, and the sulfonation degree is preferably 85% to 99%, more preferably 85% to 95%. Herein, "sulfonation degree" refers to the ratio (%) of the number of styrene units having a sulfonic acid group in the total number of styrene units having a sulfonic acid group and styrene units having no sulfonic acid group in a molecule of polystyrenesulfonic acid. In other words, the sulfonation degree refers to the ratio (%) of the number of units represented by formula (2.1) shown below with respect to the total number of the styrene units having a sulfonic acid group represented by formula (2.1) and the styrene units represented by formula (2.2).

formula (2.1)

formula (2.2)

For example, the polystyrenesulfonic acid having a sulfonation degree of 80% to 99% refers to a polystyrenesulfonic acid containing the units of formula (2.1) and formula (2.2) at a ratio of 80:20 to 99:1. When the polystyrenesulfonic acid having such a specific sulfonation degree is used, a thin film formed from an aqueous dispersion containing the resultant complex has excellent conductivity and transparency.

There is no particular limitation regarding the molecular weight of the polystyrenesulfonic acid, but the weight average molecular weight is generally in the range from 1,000 to 2,000,000, preferably 2,000 to 1,000,000, and more preferably 10,000 to 500,000.

A reaction is carried out according to the first method, using the 3,4-dialkoxythiophene as described above and the polyanion that is the polystyrenesulfonic acid having the specific sulfonation degree as mentioned above.

Third Method 3,4-Dialkoxythiophene used in this method is the same as the 3,4-dialkoxythiophene used in the first method.

There is no particular limitation regarding the polyanion used in this method. Examples of the polyanion include a polysulfonic acid such as polystyrenesulfonic acid, and polyvinyl sulfonic acid and a polycarboxylic acid such as polyacrylic acid, polymethacrylic acid and polymaleic acid. The polysulfonic acid may be a copolymer of vinylsulfonic acid and another polymerizable monomer, and the polycarboxylic acid may be a copolymer of vinylcarboxylic acid and another polymerizable monomer. Examples of the polymerizable monomer include acrylates and styrene. The weight average molecular weight of the polyanion is preferably in the range from 1,000 to 2,000,000, more preferably 2,000 to 1,000,000, and most preferably 10,000 to 500,000. The specific polystyrenesulfonic acids that are used in the first and the second methods also can be preferably used.

In this method, the pH of the reaction mixture at the time of polymerization is set to 0.82 or lower. The pH during polymerization reaction is preferably 0.01 or more and 0.82 or less, more preferably 0.01 or more and 0.60 or less. When peroxodisulfuric acid is selected from the above-listed oxidizing agents and is added to the reaction system, a relatively low pH is achieved, which is suitable. The pH of the reaction mixture is adjusted by adding an acid as necessary. As the acid, any acid that is described in the first method can be used. When the pH is set to such a value, a thin film formed from an aqueous dispersion containing the resultant complex has excellent conductivity and transparency.

A reaction is carried out at the specific pH as described above, and is carried out according to the first method using the 3,4-dialkoxythiophene and the polyanion as described above.

Fourth Method 3,4-Dialkoxythiophene used in this method is the same as the 3,4-dialkoxythiophene used in the first method. In this method, as the polyanion, a polystyrenesulfonic acid having a weight average molecular weight of 80,000 to 1,000,000 is used. Furthermore, the pH of the reaction mixture at the time of reaction is set to 0.82 or less as in the third method.

A reaction is carried out at the specific pH as described above, according to the first method, using the 3,4-dialkoxythiophene and the specific polyanion as described above.

Fifth Method 3,4-Dialkoxythiophene used in this method is the same as the 3,4-dialkoxythiophene used in the first method. In this method, as the polyanion, a polystyrenesulfonic acid having a sulfonation degree of 80% to 99% as used in the second method is employed. Furthermore, the pH is set to 0.82 or less at the time of reaction as in the third method.

A reaction is carried out at the specific pH as described above, according to the first method, using the 3,4-dialkoxythiophene and the specific polyanion as described above.

Poly(3,4-dialkoxythiophene) is produced by any of the polymerization reactions in the first to the fifth methods. This poly(3,4-dialkoxythiophene) is considered to be doped with a polyanion, and it is referred to as "a complex of poly(3,4-dialkoxythiophene) and a polyanion" or simply "a complex" in this specification.

The aqueous dispersion containing the complex is utilized to form a thin film on a substrate. The obtained thin film on the surface of the substrate has flexibility and remarkably improved transparency and conductivity, compared with a conventional thin film made of a polythiophene conductive polymer.

EXAMPLES

Hereinafter, the present invention will be described more specifically by way of examples and comparative examples. However, the present invention is not limited to the examples. It should be noted that the term "parts" in the following examples and comparative examples refers to "parts by weight".

1. Material Used

In the examples and the comparative examples, for an ion exchange treatment of the aqueous dispersion containing a complex of poly(3,4-dialkoxythiophene) and a polyanion, Lewatit S100H manufactured by BAYER AG was used as a cation exchange resin, and Lewatit MP62 by BAYER AG was used as an anion exchange resin.

2. Purification of Polystyrenesulfonic Acid

For purification of polystyrenesulfonic acid used in the examples and the comparative examples, for ultrafiltration, an ultrafilter (Biomax-100 or Biomax-50 manufactured by Millipore Corporation) was used. Low molecular weight products were removed by ultrafiltration, and then cation exchange was performed using a column that had been filled with Lewatit S100H.

3. Coating and Drying Process for a Coating Composition

As a substrate, a glass plate (JIS R3202) was used. The coating composition obtained in the examples or the comparative examples was applied with wire bar No. 12 (for preparing a layer having a thickness of 27.4 µm in a wet condition) or wire bar No. 22 (for preparing a layer having a thickness of 50.3 µm in a wet condition), and dried by blowing at 100° C. for 3 minutes, and thus a coated substrate having a thin film was obtained.

4. Evaluation of the Thin Film on the Surface of the Substrate 4.1 The Surface Resistivity was Measured With Loresta-GP (MCP-T600) Manufactured by Mitsubishi Chemical Corporation According to JIS K6911.

4.2 The Total Light Transmission and the Haze Value Were Measured With a Haze Computer HGM-2B Manufactured SUGA Test Instruments Co. Ltd. According to JIS K7150. The Total Light Transmission of an Untreated Glass Plate (JIS R-3202) Was 90.6%, and the Haze Value was 0.1%.

Example 1.1

VERSA-TL125 manufactured by Nippon NSC Ltd. was subjected to ultrafiltration using Biomax-100 manufactured by Millipore Corporation, and then was subjected to cation exchange, and diluted with deionized water, so that 1,887 parts of an aqueous solution containing 22.2 parts of polystyrenesulfonic acid (weight average molecular weight: 175,000; sulfonation degree: 100%) was obtained. To this aqueous solution, 49 parts of a 1% iron (III) sulfate aqueous solution, 30 parts of concentrated nitric acid solution, 8.8 parts of 3,4-ethylenedioxythiophene and 121 parts of a 10.9% peroxodisulfuric acid aqueous solution were added. The pH of the reaction mixture at this time was 0.82. This reaction mixture was stirred at 18° C. for 19 hours. Then, 154 parts of cation exchange resin and 232 parts of anion exchange resin were added to the reaction mixture and stirred for 2 hours. Thereafter, these ion exchange resins were filtered off so that a deionized aqueous dispersion (2,033 parts: solid content of 1.39%) containing a complex of poly(3,4-ethylenedioxythiophene) and a polystyrenesulfonic acid was obtained.

Example 1.2

9X-402 manufactured by Nippon NSC Ltd. was subjected to ultrafiltration using Biomax-100 manufactured by Millipore Corporation, and then was subjected to cation exchange, and diluted with deionized water, so that 1,887 parts of an aqueous solution containing 22.2 parts of polystyrenesulfonic acid (weight average molecular weight: 282,000; sulfonation degree: 100%) was obtained. To this aqueous solution, 49 parts of a 1% iron (III) sulfate aqueous solution, 30 parts of concentrated nitric acid solution, 8.8 parts of 3,4-ethylenedioxythiophene and 121 parts of a 10.9% peroxodisulfuric acid aqueous solution were added. The pH of the reaction mixture at this time was 0.81. This reaction mixture was stirred at 18° C. for 19 hours. Then, 154 parts of cation exchange resin and 232 parts of anion exchange resin were added to the reaction mixture and stirred for 2 hours. Thereafter, these ion exchange resins were filtered off so that a deionized aqueous dispersion (2,056 parts: solid content of 1.33%) containing a complex of poly(3,4-ethylenedioxythiophene) and a polystyrenesulfonic acid was obtained.

Example 1.3

9X-309 manufactured by Nippon NSC Ltd. was subjected to ultrafiltration using Biomax-100 manufactured by Millipore Corporation, and then was subjected to cation exchange, and diluted with deionized water, so that 1,887 parts of an aqueous solution containing 22.2 parts of polystyrenesulfonic acid (weight average molecular weight: 460,000; sulfonation degree: 100%) was obtained. To this aqueous solution, 49 parts of a 1% iron (III) sulfate aqueous solution, 30 parts of concentrated nitric acid solution, 8.8 parts of 3,4-ethylenedioxythiophene and 121 parts of a 10.9% peroxodisulfuric acid aqueous solution were added. The pH of the reaction mixture at this time was 0.84. This reaction mixture was stirred at 18° C. for 19 hours. Then, 154 parts of cation exchange resin and 232 parts of anion exchange resin were added to the reaction mixture and stirred for 2 hours. Thereafter, these ion exchange resins were filtered off so that a deionized aqueous dispersion (2,048 parts: solid content of 1.34%) containing a complex of poly(3,4-ethylenedioxythiophene) and a polystyrenesulfonic acid was obtained.

Example 1.4

VERSA-TL502 manufactured by Nippon NSC Ltd. was subjected to ultrafiltration using Biomax-100 manufactured by Millipore Corporation, and then was subjected to cation exchange, and diluted with deionized water, so that 1,887 parts of an aqueous solution containing 22.2 parts of polystyrenesulfonic acid (weight average molecular weight: 640,000; sulfonation degree: 100%) was obtained. To this aqueous solution, 49 parts of a 1% iron (III) sulfate aqueous solution, 30 parts of concentrated nitric acid solution, 8.8 parts of 3,4-ethylenedioxythiophene and 121 parts of a 10.9% peroxodisulfuric acid aqueous solution were added. The pH of the reaction mixture at this time was 0.86. This reaction mixture was stirred at 18° C. for 19 hours. Then, 154 parts of cation exchange resin and 232 parts of anion exchange resin were added to the reaction mixture and stirred for 2 hours. Thereafter, these ion exchange resins were filtered off so that a deionized aqueous dispersion (2,058 parts: solid content of 1.37%) containing a complex of poly(3,4-ethylenedioxythiophene) and a polystyrenesulfonic acid was obtained.

Example 1.5

9X-407 manufactured by Nippon NSC Ltd. was subjected to ultrafiltration using Biomax-100 manufactured by Millipore Corporation, and then was subjected to cation exchange, and diluted with deionized water, so that 1,887 parts of an aqueous solution containing 24.7 parts of polystyrenesulfonic acid (weight average molecular weight: 165,000; sulfonation degree: 90%) was obtained. To this aqueous solution, 49 parts of a 1% iron (III) sulfate aqueous solution, 30 parts of concentrated nitric acid solution, 8.8 parts of 3,4-ethylenedioxythiophene and 121 parts of a 10.9% peroxodisulfuric acid aqueous solution were added. The pH of the reaction mixture at this time was 0.93. This reaction mixture was stirred at 18° C. for 19 hours. Then, 154 parts of cation exchange resin and 232 parts of anion exchange resin were added to the reaction mixture and stirred for 2 hours. Thereafter, these ion exchange resins were filtered off so that a deionized aqueous dispersion (2,010 parts: solid content of 1.44%) containing a complex of poly(3,4-ethylenedioxythiophene) and a polystyrenesulfonic acid was obtained.

Example 1.6

9X-401 manufactured by Nippon NSC Ltd. was subjected to ultrafiltration using Biomax-100 manufactured by Millipore Corporation, and then was subjected to cation exchange, and diluted with deionized water, so that 1,887 parts of an aqueous solution containing 24.7 parts of polystyrenesulfonic acid (weight average molecular weight: 253,000; sulfonation degree: 90%) was obtained. To this aqueous solution, 49 parts of a 1% iron (III) sulfate aqueous solution, 30 parts of concentrated nitric acid solution, 8.8 parts of 3,4-ethylenedioxythiophene and 121 parts of a 10.9% peroxodisulfuric acid aqueous solution were added. The pH of the reaction mixture at this time was 0.93. This reaction mixture was stirred at 18° C. for 19 hours. Then, 154 parts of cation exchange resin and 232 parts of anion exchange resin were added to the reaction mixture and stirred for 2 hours. Thereafter, these ion exchange resins were filtered off so that a deionized aqueous dispersion (2,019 parts: solid content of 1.45%) containing a complex of poly(3,4-ethylenedioxythiophene) and a polystyrenesulfonic acid was obtained.

Example 1.7

9X-308 manufactured by Nippon NSC Ltd. was subjected to ultrafiltration using Biomax-100 manufactured by Millipore Corporation, and then was subjected to cation exchange, and diluted with deionized water, so that 1,887 parts of an aqueous solution containing 24.7 parts of polystyrenesulfonic acid (weight average molecular weight: 350,000; sulfonation degree: 90%) was obtained. To this aqueous solution, 49 parts of a 1% iron (III) sulfate aqueous solution, 30 parts of concentrated nitric acid solution, 8.8 parts of 3,4-ethylenedioxythiophene and 121 parts of a 10.9% peroxodisulfuric acid aqueous solution were added. The pH of the reaction mixture at this time was 0.80. This reaction mixture was stirred at 18° C. for 19 hours. Then, 154 parts of cation exchange resin and 232 parts of anion exchange resin were added to the reaction mixture and stirred for 2 hours. Thereafter, these ion exchange resins were filtered off so that a deionized aqueous dispersion (2,008 parts: solid content of 1.42%) containing a complex of poly(3,4-ethylenedioxythiophene) and a polystyrenesulfonic acid was obtained.

Example 1.8

VERSA-TL72 manufactured by Nippon NSC Ltd. was subjected to ultrafiltration using Biomax-50 manufactured by Millipore Corporation, and then was subjected to cation exchange, and diluted with deionized water, so that 1,887 parts of an aqueous solution containing 22.2 parts of polystyrenesulfonic acid (weight average molecular weight: 75,000; sulfonation degree: 100%) was obtained. To this aqueous solution, 49 parts of a 1% iron (III) sulfate aqueous solution, 60 parts of concentrated nitric acid solution, 8.8 parts of 3,4-ethylenedioxythiophene and 121 parts of a 10.9% peroxodisulfuric acid aqueous solution were added. The pH of the reaction mixture at this time was 0.64. This reaction mixture was stirred at 18° C. for 19 hours. Then, 154 parts of cation exchange resin and 273 parts of anion exchange resin were added to the reaction mixture and stirred for 2 hours. Thereafter, these ion exchange resins were filtered off so that a deionized aqueous dispersion (2,080 parts: solid content of 1.35%) containing a complex of poly(3,4-ethylenedioxythiophene) and a polystyrenesulfonic acid was obtained.

Example 1.9

9X-401 manufactured by Nippon NSC Ltd. was subjected to ultrafiltration using Biomax-100 manufactured by Millipore Corporation, and then was subjected to cation exchange, and diluted with deionized water, so that 1,887 parts of an aqueous solution containing 24.7 parts of polystyrenesulfonic acid (weight average molecular weight: 253,000; sulfonation degree: 90%) was obtained. To this aqueous solution, 49 parts of a 1% iron (III) sulfate aqueous solution, 60 parts of concentrated nitric acid solution, 8.8 parts of 3,4-ethylenedioxythiophene and 121 parts of a 10.9% peroxodisulfuric acid aqueous solution were added. The pH of the reaction mixture at this time was 0.55. This reaction mixture was stirred at 18° C. for 19 hours. Then, 154 parts of cation exchange resin and 273 parts of anion exchange resin were added to the reaction mixture and stirred for 2 hours. Thereafter, these ion exchange resins were filtered off so that a deionized aqueous dispersion (2,002 parts: solid content of 1.44%) containing a complex of poly(3,4-ethylenedioxythiophene) and a polystyrenesulfonic acid was obtained.

Example 1.10

9X-401 manufactured by Nippon NSC Ltd. was subjected to ultrafiltration using Biomax-100 manufactured by Millipore Corporation, and then was subjected to cation exchange, and diluted with deionized water, so that 1,887 parts of an aqueous solution containing 23.4 parts of polystyrenesulfonic acid (weight average molecular weight: 187,000; sulfonation degree: 95%) was obtained. To this aqueous solution, 49 parts of a 1% iron (III) sulfate aqueous solution, 30 parts of concentrated nitric acid solution, 8.8 parts of 3,4-ethylenedioxythiophene and 121 parts of a 10.9% peroxodisulfuric acid aqueous solution were added. The pH of the reaction mixture at this time was 0.80. This reaction mixture was stirred at 18° C. for 19 hours. Then, 154 parts of cation exchange resin and 232 parts of anion exchange resin were added to the reaction mixture and stirred for 2 hours. Thereafter, these ion exchange resins were filtered off so that a deionized aqueous dispersion (2,033 parts: solid content of 1.44%) containing a complex of poly(3,4-ethylenedioxythiophene) and a polystyrenesulfonic acid was obtained.

Example 1.11

9X-409 manufactured by Nippon NSC Ltd. was subjected to ultrafiltration using Biomax-100 manufactured by Millipore Corporation, and then was subjected to cation exchange, and diluted with deionized water, so that 1,887 parts of an aqueous solution containing 26.1 parts of polystyrenesulfonic acid (weight average molecular weight: 190,000; sulfonation degree: 85%) was obtained. To this aqueous solution, 49 parts of a 1% iron (III) sulfate aqueous solution, 30 parts of concentrated nitric acid solution, 8.8 parts of 3,4-ethylenedioxythiophene and 121 parts of a 10.9% peroxodisulfuric acid aqueous solution were added. The pH of the reaction mixture at this time was 0.80. This reaction mixture was stirred at 18° C. for 19 hours. Then, 154 parts of cation exchange resin and 232 parts of anion exchange resin were added to the reaction mixture and stirred for 2 hours. Thereafter, these ion exchange resins were filtered off so that a deionized aqueous dispersion (2,005 parts: solid content of 1.59%) containing a complex of poly(3,4-ethylenedioxythiophene) and a polystyrenesulfonic acid was obtained.

Example 1.12

VERSA-TL72 manufactured by Nippon NSC Ltd. was subjected to ultrafiltration using Biomax-50 manufactured by Millipore Corporation, and then was subjected to cation exchange, and diluted with deionized water, so that 1,887 parts of an aqueous solution containing 22.2 parts of polystyrenesulfonic acid (weight average molecular weight: 75,000; sulfonation degree: 100%) was obtained. To this aqueous solution, 49 parts of a 1% iron (III) sulfate aqueous solution, 200 parts of concentrated nitric acid solution, 8.8 parts of 3,4-ethylenedioxythiophene and 121 parts of a 10.9% peroxodisulfuric acid aqueous solution were added. The pH of the reaction mixture at this time was 0.10. This reaction mixture was stirred at 18° C. for 19 hours. Then, 154 parts of cation exchange resin and 1016 parts of anion exchange resin were added to the reaction mixture and stirred for 2 hours. Thereafter, these ion exchange resins were filtered off so that a deionized aqueous dispersion (1,989 parts: solid content of 1.30%) containing a complex of poly(3,4-ethylenedioxythiophene) and a polystyrenesulfonic acid was obtained.

Comparative Example 1.1

VERSA-TL72 manufactured by Nippon NSC Ltd. was subjected to ultrafiltration using Biomax-50 manufactured by Millipore Corporation, and then was subjected to cation exchange, and diluted with deionized water, so that 1,887 parts of an aqueous solution containing 22.2 parts of polystyrenesulfonic acid (weight average molecular weight: 75,000; sulfonation degree: 100%) was obtained. To this aqueous solution, 49 parts of a 1% iron (III) sulfate aqueous solution, 30 parts of concentrated nitric acid solution, 8.8 parts of 3,4-ethylenedioxythiophene and 121 parts of a 10.9% peroxodisulfuric acid aqueous solution were added. The pH of the reaction mixture at this time was 0.83. This reaction mixture was stirred at 18° C. for 19 hours. Then, 154 parts of cation exchange resin and 232 parts of anion exchange resin were added to the reaction mixture and stirred for 2 hours. Thereafter, these ion exchange resins were filtered off so that a deionized aqueous dispersion (2,075 parts: solid content of 1.36%) containing a complex of poly(3,4-ethylenedioxythiophene) and a polystyrenesulfonic acid was obtained.

Comparative Example 1.2

YE-970 manufactured by Nippon NSC Ltd. was subjected to ultrafiltration using Biomax-50 manufactured by Millipore Corporation, and then was subjected to cation exchange, and diluted with deionized water, so that 1,887 parts of an aqueous solution containing 33.1 parts of polystyrenesulfonic acid (weight average molecular weight: 118,000; sulfonation degree: 67%) was obtained. To this aqueous solution, 49 parts of a 1% iron (III) sulfate aqueous solution, 30 parts of concentrated nitric acid solution, 8.8 parts of 3,4-ethylenedioxythiophene and 121 parts of a 10.9% peroxodisulfuric acid aqueous solution were added. The pH of the reaction mixture at this time was 0.87. This reaction mixture was stirred at 18° C. for 19 hours. Then, 154 parts of cation exchange resin and 232 parts of anion exchange resin were added to the reaction mixture and stirred for 2 hours. Thereafter, these ion exchange resins were filtered off so that a deionized aqueous dispersion (2,075 parts: solid content of 1.36%) containing a complex of poly(3,4-ethylenedioxythiophene) and a polystyrenesulfonic acid was obtained.

Example 2.1

First, 40 parts of ethanol and 20 parts of deionized water were added to 100 parts of the aqueous dispersion containing the complex of poly(3,4-dialkoxythiophene) and polystyrenesulfonic acid obtained in Example 1.1, and the mixture was stirred for 10 minutes, so that 150 parts of a coating liquid was obtained.

Examples 2.2 to 2.12

The same operation as in Example 2.1 was performed except that the aqueous dispersion obtained in Example 1.1 was replaced by each of the aqueous dispersions obtained in Examples 1.2 to 1.12, so that 150 parts of a coating liquid was correspondingly obtained.

Comparative Examples 2.1 to 2.2

The same operation as in Example 2.1 was performed except that the aqueous dispersion obtained in Example 1.1 was replaced by each of the aqueous dispersions obtained in Comparative Examples 1.1 to 1.2, so that 150 parts of a coating liquid was correspondingly obtained.

Example 3.1

The coating liquid obtained in Example 2.1 was coated onto a surface of a glass plate with each of wire bars No. 12 and No. 22, and then dried, so that a substrate coated with a thin film was obtained. Table I shows the evaluation results of the total light transmission and the haze value of the obtained coated substrate and the surface resistivity of the thin film on the substrate. The total light transmission and the haze value of the glass plate used as the substrate were 90.6% and 0.1%, respectively.

Examples 3.2 to 3.12

The same operation as in Example 3.1 was performed except that the coating liquid obtained in Example 2.1 was replaced by each of the coating liquid obtained in Examples 2.2 to 2.12. Table 1 also shows the evaluation results of the obtained thin film on the surface of the substrate.

Comparative Examples 3.1 to 3.2

The same operation as in Example 3.1 was performed except that the coating liquid obtained in Example 2.1 was replaced by each of the coating liquids obtained in Comparative Examples 2.1 to 2.2. Table 1 also shows the evaluation results of the obtained thin film on the surface of the substrate.

TABLE 1

| | Wire bar | Total light Transmission (%) | Surface resistivity (Ω/□) | Haze value (%) |
|---|---|---|---|---|
| Example 3.1 | No. 12 | 82.3 | 3.8E+04 | 0.6 |
| | No. 22 | 77.4 | 2.4E+04 | 0.8 |
| Example 3.2 | No. 12 | 82.3 | 3.6E+04 | 1.2 |
| | No. 22 | 77.1 | 2.1E+04 | 1.4 |
| Example 3.3 | No. 12 | 81.9 | 3.4E+04 | 0.5 |
| | No. 22 | 76.1 | 2.0E+04 | 0.7 |
| Example 3.4 | No. 12 | 81.2 | 3.6E+04 | 0.8 |
| | No. 22 | 76.0 | 2.3E+04 | 0.5 |
| Example 3.5 | No. 12 | 82.8 | 3.2E+04 | 0.2 |
| | No. 22 | 77.4 | 1.6E+04 | 0.3 |
| Example 3.6 | No. 12 | 82.6 | 3.0E+04 | 0.5 |
| | No. 22 | 77.8 | 1.9E+04 | 0.4 |
| Example 3.7 | No. 12 | 82.7 | 3.4E+04 | 1.0 |
| | No. 22 | 77.0 | 2.1E+04 | 0.8 |
| Example 3.8 | No. 12 | 81.5 | 4.7E+04 | 1.3 |
| | No. 22 | 75.8 | 2.7E+04 | 0.6 |
| Example 3.9 | No. 12 | 82.8 | 2.5E+04 | 1.0 |
| | No. 22 | 76.7 | 1.5E+04 | 0.8 |
| Example 3.10 | No. 12 | 82.7 | 3.4E+04 | 0.6 |
| | No. 22 | 76.1 | 1.8E+04 | 0.8 |
| Example 3.11 | No. 12 | 82.4 | 3.2E+04 | 0.7 |
| | No. 22 | 76.7 | 1.9E+04 | 0.9 |
| Example 3.12 | No. 12 | 80.8 | 4.6E+04 | 0.5 |
| | No. 22 | 74.0 | 2.5E+04 | 0.8 |
| Comparative Example 3.1 | No. 12 | 81.6 | 5.4E+04 | 0.6 |
| | No. 22 | 76.5 | 3.6E+04 | 0.8 |
| Comparative Example 3.1 | No. 12 | 81.2 | 8.0E+04 | 1.2 |
| | No. 22 | 76.2 | 4.7E+04 | 1.4 |

Example 4

Figure 1:
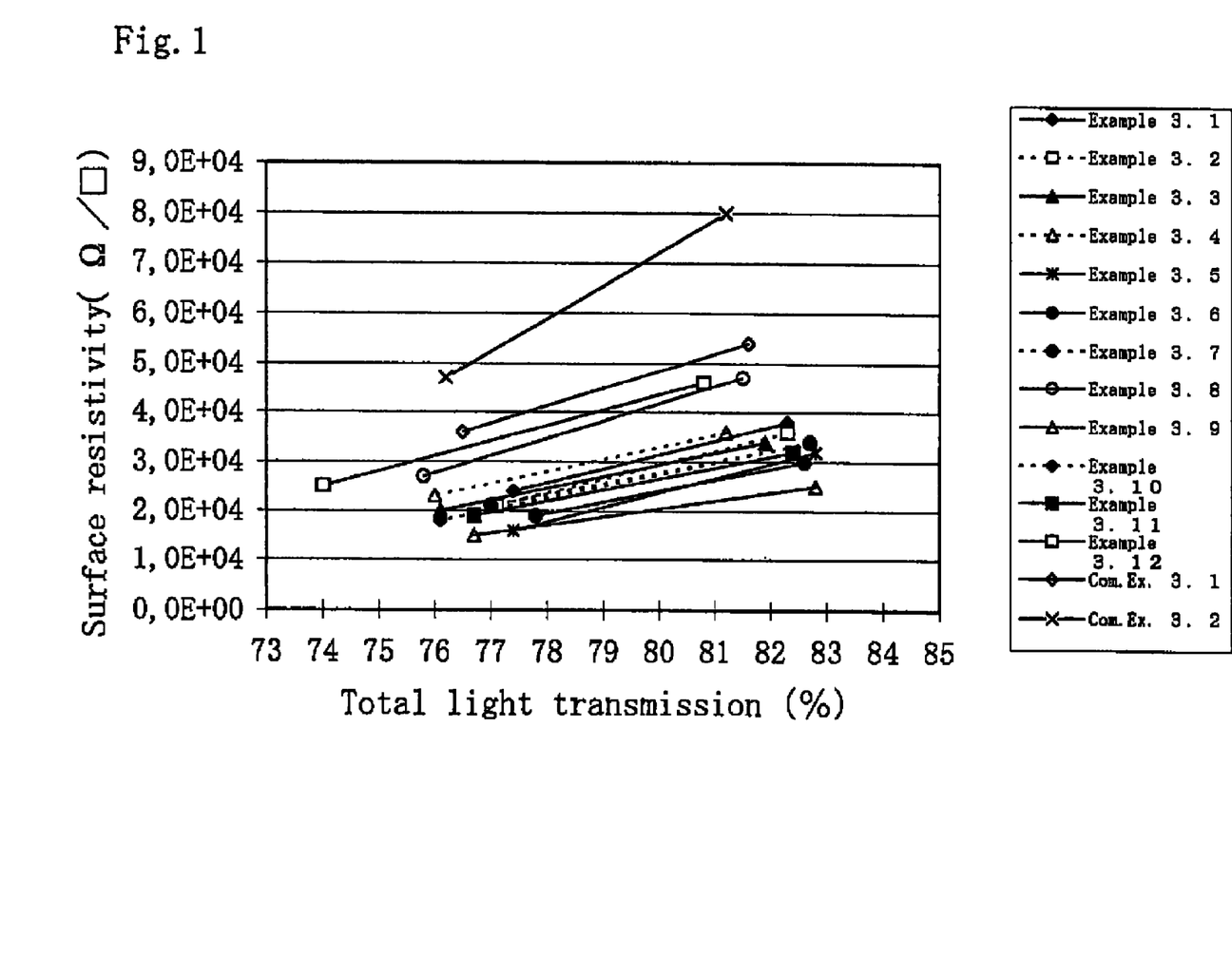
FIG. 1 is a graph showing the relationship between the total light transmission and the surface resistivity of a coated substrate obtained by the method of the present invention.

The relationship between the total light transmission and the surface resistivity in each of the examples and the comparative examples described in Table 1 was plotted on a graph. This is shown in FIG. 1. Furthermore, the surface resistivity at a total light transmission of 80% was read from this graph. Table 2 shows the molecular weight and the sulfonation degree of the polystyrenesulfonic acids used in the examples and the comparative examples, and the surface resistivity at a total light transmission of 80%.

TABLE 2

|  | Aqueous dispersion | Weight average molecular weight of polystyrenesulfonic acid | Sulfonation degree of polystyrenesulfonic acid (%) | pH | Surface resistivity $\Omega/\square$ a) |
|---|---|---|---|---|---|
| Example 3.1 | Example 1.1 | 175.000 | 100 | 0.82 | 3.00E+04 |
| Example 3.2 | Example 1.2 | 282.000 | 100 | 0.81 | 3.00E+04 |
| Example 3.3 | Example 1.3 | 460.000 | 100 | 0.84 | 3.00E+04 |
| Example 3.4 | Example 1.4 | 640.000 | 100 | 0.86 | 3.30E+04 |
| Example 3.5 | Example 1.5 | 165.000 | 90 | 0.93 | 2.40E+04 |
| Example 3.6 | Example 1.6 | 253.000 | 90 | 0.93 | 2.50E+04 |
| Example 3.7 | Example 1.7 | 350.000 | 90 | 0.80 | 2.70E+04 |
| Example 3.8 | Example 1.8 | 75.000 | 100 | 0.64 | 4.20E+04 |
| Example 3.9 | Example 1.9 | 253.000 | 90 | 0.55 | 2.00E+04 |
| Example 3.10 | Example 1.10 | 187.000 | 95 | 0.80 | 2.70E+04 |
| Example 3.11 | Example 1.11 | 190.000 | 85 | 0.80 | 2.60E+04 |
| Example 3.12 | Example 1.12 | 75.000 | 100 | 0.10 | 4.40E+04 |
| Comparative Example 3.1 | Comparative Example 1.1 | 75.000 | 100 | 0.83 | 4.80E+04 |
| Comparative Example 3.2 | Comparative Example 1.2 | 118.000 | 67 | 0.87 | 6.30E+04 | a) Surface resistivity when total light transmission is 80%.

Referring to the results of Examples 3.1 and Comparative Example 3.1 of Table 2, when the molecular weight of the polystyrenesulfonic acid increases from 75,000 to 175,000, the surface resistivity at a total light transmission of 80% decreased from $4.8 \times 10^4 \, \Omega/\square$ to $3.0 \times 10^4 \, \Omega/\square$, which shows that the higher the molecular weight is, the higher the conductivity is. Referring to Examples 3.1 to 3.4, when the molecular weight of the polystyrenesulfonic acid is between 175,000 to 640,000 and the sulfonation degree of the polystyrenesulfonic acid is 100%, then the surface resistivity at a total light transmission of 80% is substantially constant at $3.0 \times 10^4 \, \Omega/\square$.

When the results of Example 3.1 is compared with those of Example 3.5, the following relations can be recognized: when a polystyrenesulfonic acid having a sulfonation degree of 100% is used, the surface resistivity at a total light transmission of 80% is $3.0 \times 10^4 \, \Omega/\square$, and when a polystyrenesulfonic acid having a sulfonation degree of 90% is used, the surface resistivity at a total light transmission of 80% decreases to $2.4 \times 10^4 \, \Omega/\square$. This shows that the conductivity is higher when the sulfonation degree is 90%.

The comparison between Example 3.8 and Comparative Example 3.1 and comparison between Examples 3.9 and 3.6 confirms that reducing the pH during reaction further reduces the surface resistivity at a total light transmission of 80%. In other words, a high conductivity can be obtained.

Aqueous dispersion comprising a complex of poly(3,4-dialkoxythiophene) and a polyanion can be easily produced by the method of the present invention. The obtained aqueous dispersion containing the complex can be preferably used to form a thin film on various substrates. The obtained thin film has excellent transparency and conductivity. Therefore, it can be used preferably for surface electrodes of electroluminescence panels, pixel electrodes of liquid crystal displays, electrodes of capacitors, various transparent electrodes such as transparent electrodes of touch panels, transparent electrodes of membrane switches, and transparent electrodes of electronic paper, electromagnetic shielding of cathode-ray tube displays, electromagnetic shield for cutting noise in liquid crystal displays or a panel for a game similar to a pinball originated from Japan called pachinko, a dimmer glass and electrodes of organic TFTs. The obtained thin film has flexibility, so that the thin film is particularly useful as a conductive transparent film formed on a plastic film substrate.

What is claimed is:

1. An aqueous dispersion containing a complex of poly(3,4-dialkoxythiophene) and a polyanion wherein the polyanion has a weight average molecular weight of 80,000 to 1,000,000 and a sulfonation degree of 80 to 100%.

2. A method for producing an aqueous dispersion containing a complex of poly(3,4-dialkoxythiophene) and a polyanion according to claim 1, said method comprising:

polymerizing 3,4-dialkoxythiophene represented by formula (1):

wherein $R^1$ and $R^2$ are independently hydrogen or a $C_1$-$C_4$ alkyl group, or together form a $C_1$-$C_4$ alkylene group which may optionally be substituted, wherein the polymerizing is performed in the presence of the polyanion by using an oxidizing agent in an aqueous solvent, and the polyanion is polystyrenesulfonic acid having a sulfonation degree of 80 to 99%.

3. A method for producing an aqueous dispersion containing a complex of poly(3,4-dialkoxythiophene) and a polyanion according to claim 1, said method comprising:

polymerizing 3,4-dialkoxythiophene represented by formula (1):

wherein $R^1$ and $R^2$ are independently hydrogen or a $C_1$-$C_4$ alkyl group, or together form a $C_1$-$C_4$ alkylene group which may optionally be substituted, wherein the polymerizing is performed in the presence of the polyanion by using an oxidizing agent in an aqueous solvent, and an acid selected from the group consisting of water-soluble inorganic acids and water-soluble organic acids is added to the reaction mixture so as to adjust the pH of the resultant reaction mixture to 0.82 or lower.

4. A method for producing an aqueous dispersion containing a complex of poly(3,4-dialkoxythiophene) and a polyanion according to claim 1, said method comprising:

polymerizing 3,4-dialkoxythiophene represented by formula (1):

wherein $R^1$ and $R^2$ are independently hydrogen or a $C_1$-$C_4$ alkyl group, or together form a $C_1$-$C_4$ alkylene group which may optionally be substituted, wherein the polymerizing is performed in the presence of the polyanion by using an oxidizing agent in an aqueous solvent, the polyanion is polystyrenesulfonic acid having a weight average molecular weight of 80,000 to 1,000,000, and an acid selected from the group consisting of water-soluble inorganic acids and water-soluble organic acids is added to the reaction mixture so as to adjust the pH of the resultant reaction mixture to 0.82 or lower.

5. A method for producing an aqueous dispersion containing a complex of poly(3,4-dialkoxythiophene) and a polyanion according to claim 1, said method comprising:

polymerizing 3,4-dialkoxythiophene represented by formula (1):

wherein $R^1$ and $R^2$ are independently hydrogen or a $C_1$-$C_4$ alkyl group, or together form a $C_1$-$C_4$ alkylene group which may optionally be substituted, wherein the polymerizing is performed in the presence of the polyanion by using an oxidizing agent in an aqueous solvent, the polyanion is polystyrenesulfonic acid having a sulfonation degree of 80 to 99%, and an acid selected from the group consisting of water-soluble inorganic acids and water-soluble organic acids is added to the reaction mixture so as to adjust the pH of the resultant reaction mixture to 0.82 or lower.

6. A method for producing an aqueous dispersion containing a complex of poly(3,4-dialkoxythiophene) and a polyanion according to claim 1, said method comprising:

polymerizing 3,4-dialkoxythiophene represented by formula (1):

wherein $R^1$ and $R^2$ are independently hydrogen or a $C_1$-$C_4$ alkyl group, or together form a $C_1$-$C_4$ alkylene group which may optionally be substituted, wherein the polymerizing is performed in the presence of the polyanion by using an oxidizing agent in an aqueous solvent, the polyanion is polystyrenesulfonic acid having a weight average molecular weight of 80,000 to 1,000,000, and the sulfonation degree of the polystyrenesulfonic acid is 99% or more.

* * * * *